(12) United States Patent
Luus et al.

(10) Patent No.: US 11,803,657 B2
(45) Date of Patent: Oct. 31, 2023

(54) GENERATION OF REPRESENTATIVE DATA TO PRESERVE MEMBERSHIP PRIVACY

(71) Applicant: International Business Machines Corporation, Armonk, NY (US)

(72) Inventors: Francois Pierre Luus, Wierdapark (ZA); Naweed Aghmad Khan, Johannesburg (ZA); Ndivhuwo Makondo, Pretoria (ZA); Etienne Eben Vos, Johannesburg (ZA); Ismail Yunus Akhalwaya, Emmarentia (ZA)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 16/856,730

(22) Filed: Apr. 23, 2020

(65) Prior Publication Data
US 2021/0334403 A1 Oct. 28, 2021

(51) Int. Cl.
*G06F 21/62* (2013.01)
*G06N 3/088* (2023.01)
*G06N 3/045* (2023.01)

(52) U.S. Cl.
CPC ......... *G06F 21/6245* (2013.01); *G06N 3/045* (2023.01); *G06N 3/088* (2013.01)

(58) Field of Classification Search
CPC ............ G06F 21/6245; G06F 21/6254; G06N 3/0454; G06N 3/088; G06N 3/08
USPC .......................................................... 726/26
See application file for complete search history.

(56) References Cited

U.S. PATENT DOCUMENTS

| | | |
|---|---|---|
| 2007/0143289 A1 | 6/2007 | Dwork et al. |
| 2015/0235051 A1 | 8/2015 | Fawaz et al. |
| 2017/0293857 A1 | 10/2017 | Stajner |
| 2017/0372226 A1 | 12/2017 | Costa et al. |
| 2018/0255023 A1 | 9/2018 | Whaley et al. |
| 2018/0300502 A1 | 10/2018 | Mandal et al. |
| 2021/0125057 A1* | 4/2021 | Choi ............... G06N 20/00 |

FOREIGN PATENT DOCUMENTS

CN 109977694 A 7/2019

OTHER PUBLICATIONS

Machine Learning with Membership Privacy using Adversarial Regulation, Nast et al, Oct. 15-19, 2018, 13 pages total.*
Tan et al., Privacy Preserving Anomaly Detection for Internet of Things Data, IP.com, Jan. 19, 2018, 6 pages.

(Continued)

*Primary Examiner* — Thierry L Pham
(74) *Attorney, Agent, or Firm* — Shimon Benjamin; Otterstedt & Kammer PLLC

(57) ABSTRACT

Methods and systems for generating representative data. A generator is configured to create, using a learning model, one or more generated records based on a plurality of training records obtained from a sensitive database. A discriminator is trained to identify the generated records as being generated based on the training records and a privacy adversary is trained to identify a training sample as being more similar to a distribution of the generated records than a distribution of the reference records.

7 Claims, 8 Drawing Sheets

(56) References Cited

OTHER PUBLICATIONS

Nasr et al., Machine Learning with Membership Privacy using Adversarial Regularization, 2018 ACM SIGSAC Conference on Computer and Communications Security, Oct. 19, 2018, pp. 634-646.

Li et al., Membership Privacy: A Unifying Framework for Privacy Definitions, 2013 ACM SIGSAC conference on Computer & communications security, Nov. 8, 2013, 13 pages.

Rahman et al., Membership Inference Attack against Differentially Private Deep Learning Model, Transactions on Data Privacy 11 (2018) 61-79, Feb. 7, 2018, pp. 61-79.

Park et al., Data synthesis based on generative adversarial networks. Proceedings of the VLDB Endowment, 11(10), pp. 1071-1083, 2018.

Feutry et al., Learning anonymized representations with adversarial neural networks. arXiv preprint arXiv:1802.09386, 2018.

Song et al., Stochastic gradient descent with differentially private updates. In 2013 IEEE Global Conference on Signal and Information Processing (pp. 245-248), 2013, IEEE.

Peter Mell and Timothy Grance, The NIST Definition of Cloud Computing, NIST Special Publication 800-145, Sep. 2011, cover, pp. i-iii and 1-3.

\* cited by examiner

GENERATION OF REPRESENTATIVE DATA TO PRESERVE MEMBERSHIP PRIVACY

BACKGROUND

The present invention relates to the electrical, electronic and computer arts, and more specifically, to systems and methods for generating privacy-protected data.

Machine learning (ML) models and, more specifically, supervised neural-networks (NNs) are used to learn algorithmic functions that provide a mapping between a set of input features and a desired outcome (a set of results). The large capacity of these models allows the model to directly store and learn from the distribution of the input data. This presents challenges for preserving privacy, which should be duly addressed. Considerations for preserving data privacy are quite pertinent in a number of scenarios and it is important to avoid possible exposure of personal or sensitive information used to train machine learning models.

Alternatively, when a machine learning model is exposed as an application programming interface (API) endpoint in an untrusted environment, development systems are exposed to potential attacks by adversaries (such as membership inference, re-identification attacks, model inversion, model theft, and the like) and the possible exposure of personal or sensitive information used to train the model.

Conventional privacy preserving methods exist for defending from the attacks cited above, including manual methods of data tokenisation, masking, and anonymisation. Existing techniques for re-identifying anonymised data using other sources of data, such as social media accounts, however, limit the effectiveness of this approach. Differentially private stochastic gradient descent (SGD) for training ML models exposed as API endpoints, using gradient noise and clipping, is another technique. The goal of differential privacy is to make the model behaviour indistinguishable to an attack or adversary regardless of whether individual data points were included in model training or not. Differential privacy via SGD, however, may be too conservative and therefore reduces utility of the data.

Context-aware privacy that manually defines utility and sensitivity labels used in training ML models, allowing a utility-privacy tradeoff to be easily optimized for, is also conventionally used. This does not, however, guarantee broad privacy. Finally, encoder-based privacy that modifies and obfuscates the original data to a numerical vector format, not understandable to humans, is also used. Data generated through the privacy-preserving encoder is then shared instead of the original data. However, not using a generator limits the amount of data that can be synthesized for model training.

SUMMARY

Principles of the invention provide techniques for generating representative data to preserve membership privacy. In one aspect, an exemplary system for generating representative data comprises a generator configured to create, using a learning model, one or more generated records based on a plurality of training records obtained from a sensitive database; a discriminator trained to identify the generated records as being generated based on the training records; and a privacy adversary trained to identify a training sample as being more similar to a distribution of the generated records than a distribution of reference records, the generator, discriminator, and the privacy adversary being in data communication.

In one aspect, a method for generating representative data comprises creating, by a generator using a learning model, one or more generated records based on a plurality of training records obtained from a sensitive database; identifying, by a discriminator, the generated records as being generated based on the training records; and identifying, by a privacy adversary, a training sample as being more similar to a distribution of the generated records than a distribution of reference records.

In one aspect, a non-transitory computer readable medium comprises computer executable instructions which when executed by a computer cause the computer to perform a method of implementing a generator, a discriminator, and a privacy adversary; creating, by the generator using a learning model, one or more generated records based on a plurality of training records obtained from a sensitive database; identifying, by the discriminator, the generated records as being generated based on the training records; and identifying, by the privacy adversary, a training sample as being more similar to a distribution of the generated records than a distribution of reference records.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

data generation according to a representative training dataset with privacy-hardening;

establishment of privacy adversaries for learning privacy vulnerabilities;

establishment of a context-free classifier;

privacy-preserving Generative Adversarial Networks (GANs) with generators;

enabling of generator black-box access with privacy guarantees in an untrusted environment;

techniques for generating and managing privacy-preserving data such that a trusted data publisher may introduce data-level privacy, with a privacy guarantee, for post-processing in an untrusted environment; and enhanced security for scenarios such as crowd-sourcing ML model development.

These and other features and advantages of the present invention will become apparent from the following detailed description of illustrative embodiments thereof, which is to be read in connection with the accompanying drawings.

DETAILED DESCRIPTION

Figure 1:
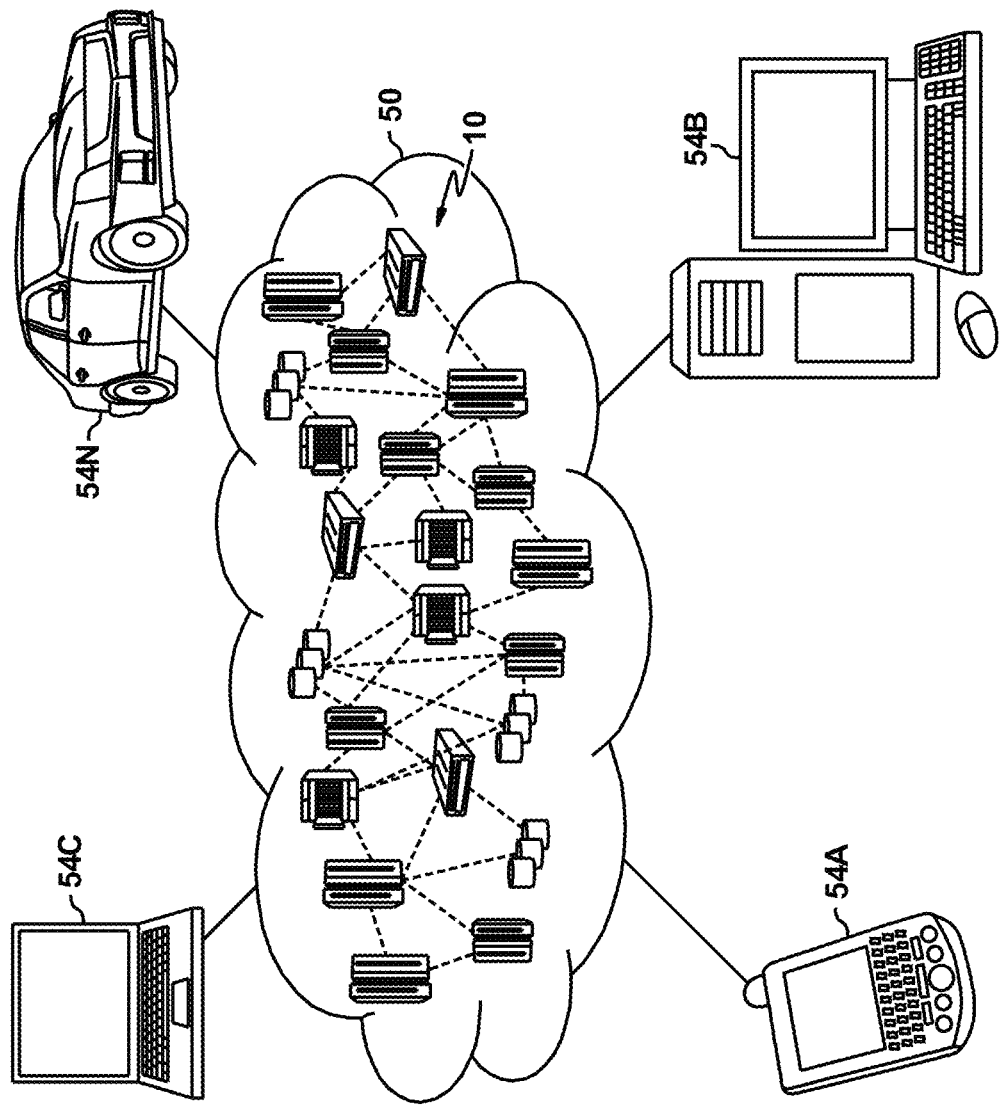
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
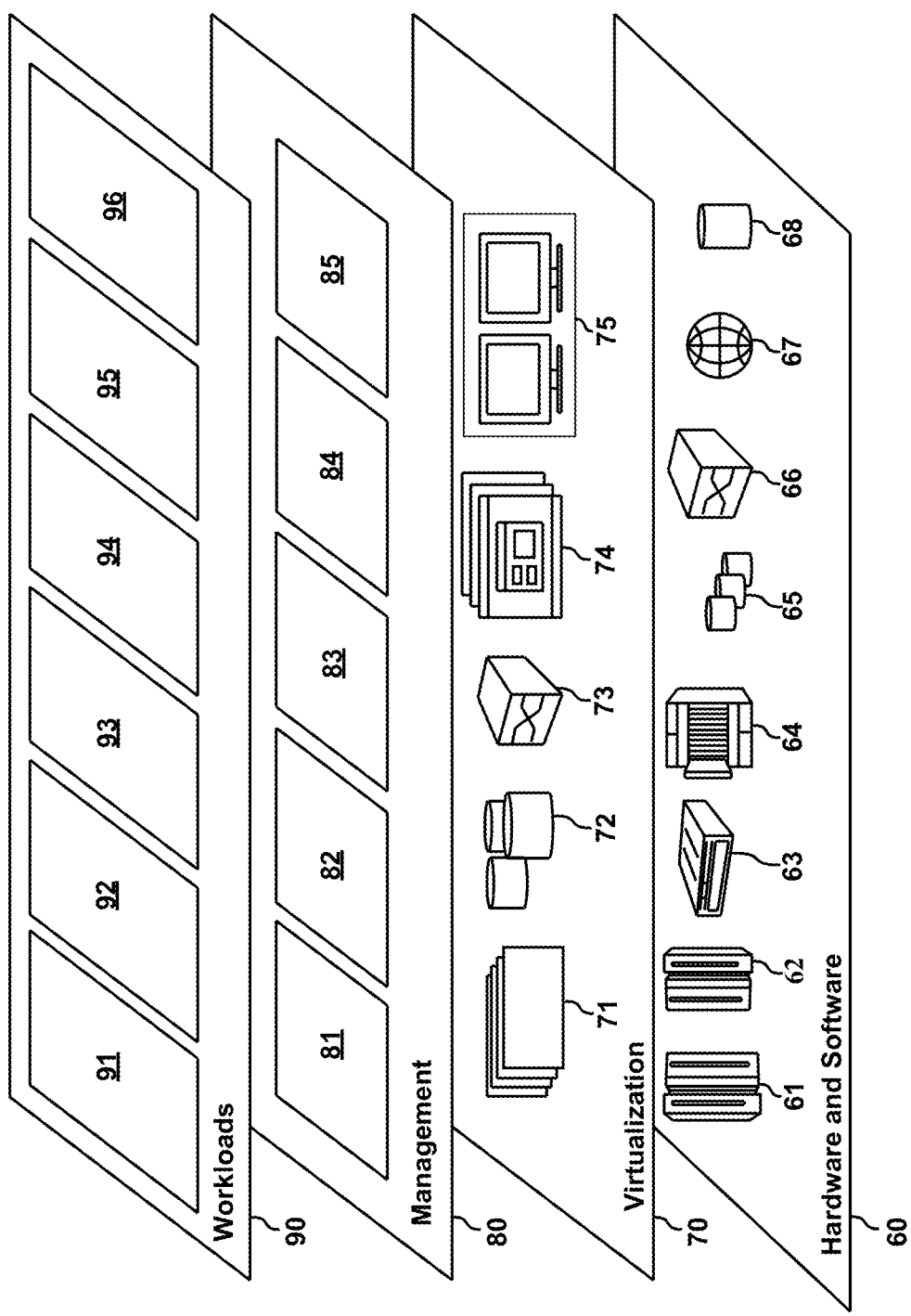
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and representative data generator 96.

Generally, methods, apparatus, and systems for generating data according to a representative training dataset are disclosed. In one example embodiment, the generated data is optimized for privacy such that it cannot be used to determine if any particular generated record was part of or originated from the training dataset. In addition, models generated based on the representative training dataset are generated such that the privacy of the training dataset is preserved. Aspects of the system include the establishment of privacy adversaries for learning privacy vulnerabilities, a context-free classifier, and privacy-preserving Generative Adversarial Networks (GANs) with generators. In one example embodiment, the training is conducted in a private cloud environment, and made available on a public cloud platform for consumption and usage by, for example, local and remote client devices.

In one example embodiment, rather than utilizing encoding-based approaches that limit data release to an original (modified) set, the disclosed generative approach allows data publishers to produce infinite data with a privacy guarantee. The enabling of generator black-box access with privacy guarantees in an untrusted zone promotes wider applicability and model development. While non-adversarial approaches can lead to reduced utility, direct adversarial optimization of privacy in a GAN framework can jointly optimize use of the mutual information between utility and privacy.

Exposing a machine learning model to untrusted access is a common deployment method that requires additional privacy protection mechanisms due to the increased risk of the model leaking private information associated with the training set. For example, a classifier exposed to an untrusted environment may suffer malicious attacks where an adversary attempts to make inferences about the samples being classified by the adversary using the exposed classifier. For example, consider a bank loan processing application that allows a potential client to enter personal information (such as salary information, asset information, and the like) to determine if the client is pre-approved for a loan. An adversary may utilize the bank loan processing application to determine if a potential victim (a given user known to the adversary) is a client of the bank. The adversary would be in the possession of a limited amount of information regarding the given user and would be aware that the bank may have based the loan approval criteria of the loan processing application on the loan history of the bank's own clientele. If not properly sanitized, the client history information used to develop the loan processing application may be inferred via the loan processing application; that is, the adversary may utilize the application and information known about the potential victim to infer whether the potential victim is a client of the bank. In practice, the adversary enters into the loan application valid information regarding the potential victim while entering bogus material in other fields and/or leaving some fields blank. The adversary is then able to infer, for example, whether the victim is a client of the bank and/or determine other personal information. The disclosed methods and systems generate and manage privacy-preserving data such that a trusted data publisher may introduce data-level privacy, with a privacy guarantee, for post-processing in an untrusted environment, thus preventing the adversary from making inferences about a potential victim.

Figure 3:
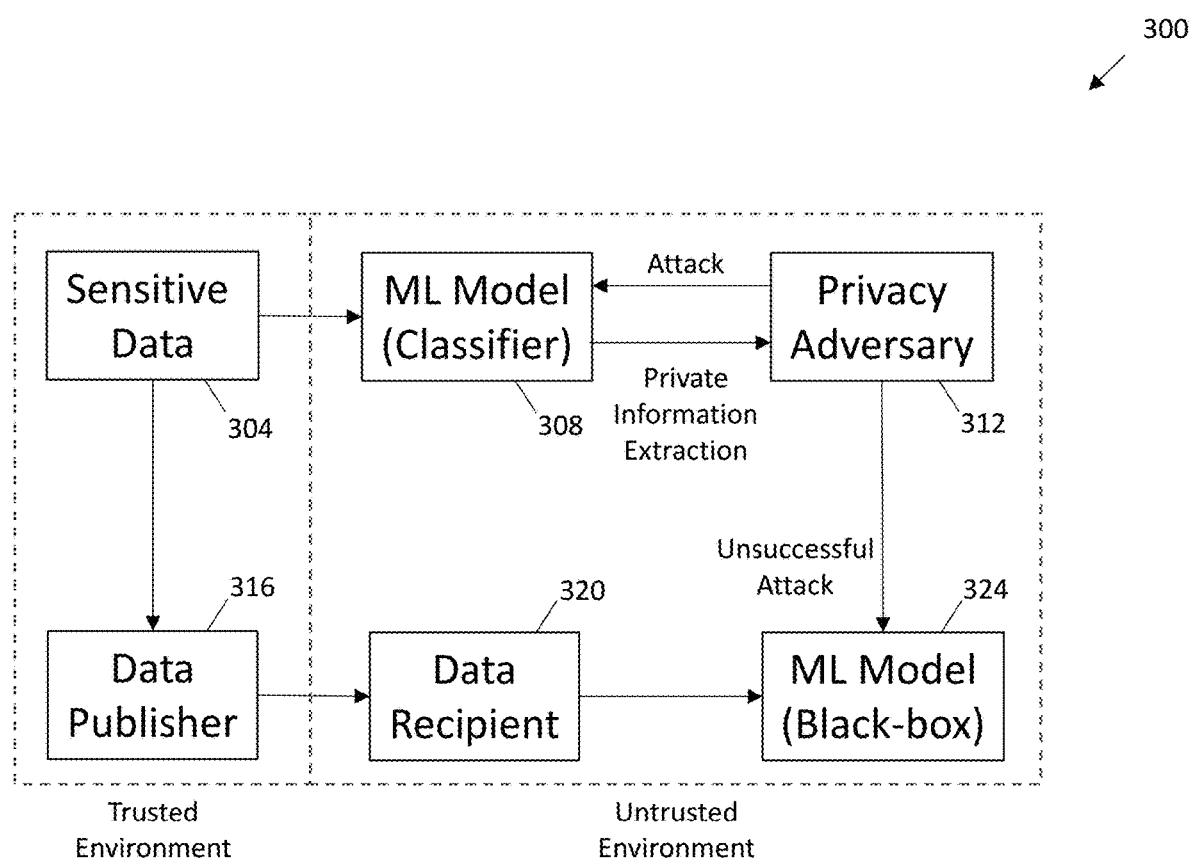
FIG. 3 illustrates a high-level view of an example data generating system for generating representative data while preserving data privacy, in accordance with an example embodiment.

FIG. 3 illustrates a high-level view of an example data generating system 300 for generating representative data while preserving data privacy, in accordance with an example embodiment. As illustrated in FIG. 3, the environment on the left-side is a trusted environment, such as the environment of a data owner, and the environment on the right-side is an untrusted environment, such as the Internet. The top of FIG. 3 illustrates sensitive data 304 being exposed via a machine learning model 308 (a classifier) to a privacy adversary 312. The privacy adversary mounts an attack on the machine learning model 308, as described above, and extracts private information from the sensitive data 304. In one example embodiment, to protect the private information of the sensitive data 304, a data publisher 316 that employs a Membership Inference GAN (MIGAN) using a conditional GAN structure implements a privacy-hardening process, as described more fully below in conjunction with FIG. 4. The data synthesized by the data publisher 316 that is shared with the data recipient 320 has privacy guaranteed. The data recipient 320 can train a ML model 324 using the synthesized data, but the resulting ML model 324 will not be susceptible to attacks by adversaries.

In one or more embodiments, the privacy adversary "wants" to identify training samples as closer to generated samples than reference samples, because this means there is information in the generated samples that reveals more than the reference samples. If the privacy adversary is fooled, then it means that the training samples essentially blend into the reference samples, and that the generated samples should not reveal more particulars about the training data.

In an alternative embodiment, the privacy preserving MIGAN can be extended to generate structured tabular data. In such a scenario, the table columns represent labels, sensitive labels may be explicitly indicated, or field values may be randomly removed during model training to identify and mitigate implicit column sensitivity. The privacy adversary is modified to only operate on the feature dimensions indicated as sensitive, e.g. by multiplying all non-sensitive feature dimensions with 0.

In general, the following notation is used:
n: a random noise vector (d-dimensional);
$Y_g$: the output features/class label (conditioning; also referred to as {Y_G} herein);
$X_G$: the generated fake sample (also referred to as {X_G} herein);
$Y_g'$: the predicted features/class label from the generated sample;
$X_T$: the training sample (also referred to as {X_T} herein);
$Y_T$: the predicted training feature/output label;
$X_R$: the reference sample (for non-membership ground truth; also referred to as {X_R} herein);
$X_R'$: the reference test sample (held-out from reference records; also referred to as {X_R'} herein);
$Y_R$: the predicted reference feature/output label (also referred to as {Y_R} herein);
$Y_R'$: the predicted reference feature/output label (also referred to as {Y_R'} herein);
$N_c+1$: the catch-all class label (discriminator places fake samples here);
$Z_G$: membership decision by a privacy adversary (where 0 is not a member, 1 is a member of training data);
g: a conditional generator module;
g(n, Y): generator (noise vector, true label);
d: a discriminator module;
d(X): discriminator (sample);
f: the classifier model (to be exposed);
f(X): utility (sample)–classifier output [p(f(X))]; and
h: the membership privacy adversary.

Generator membership privacy ensures that the probability distribution of the true labels is used to generate samples, but the generated samples cannot infer the true samples:

$$(P_T \rightarrow P_G \rightarrow P_T)$$

while the classifier membership privacy ensures that the conditional distribution of the generated samples, given their label, cannot reveal membership to unseen but related training data:

$$(P_T \rightarrow P_G \rightarrow p(y|x) \not\rightarrow P_T)$$

Figure 4:
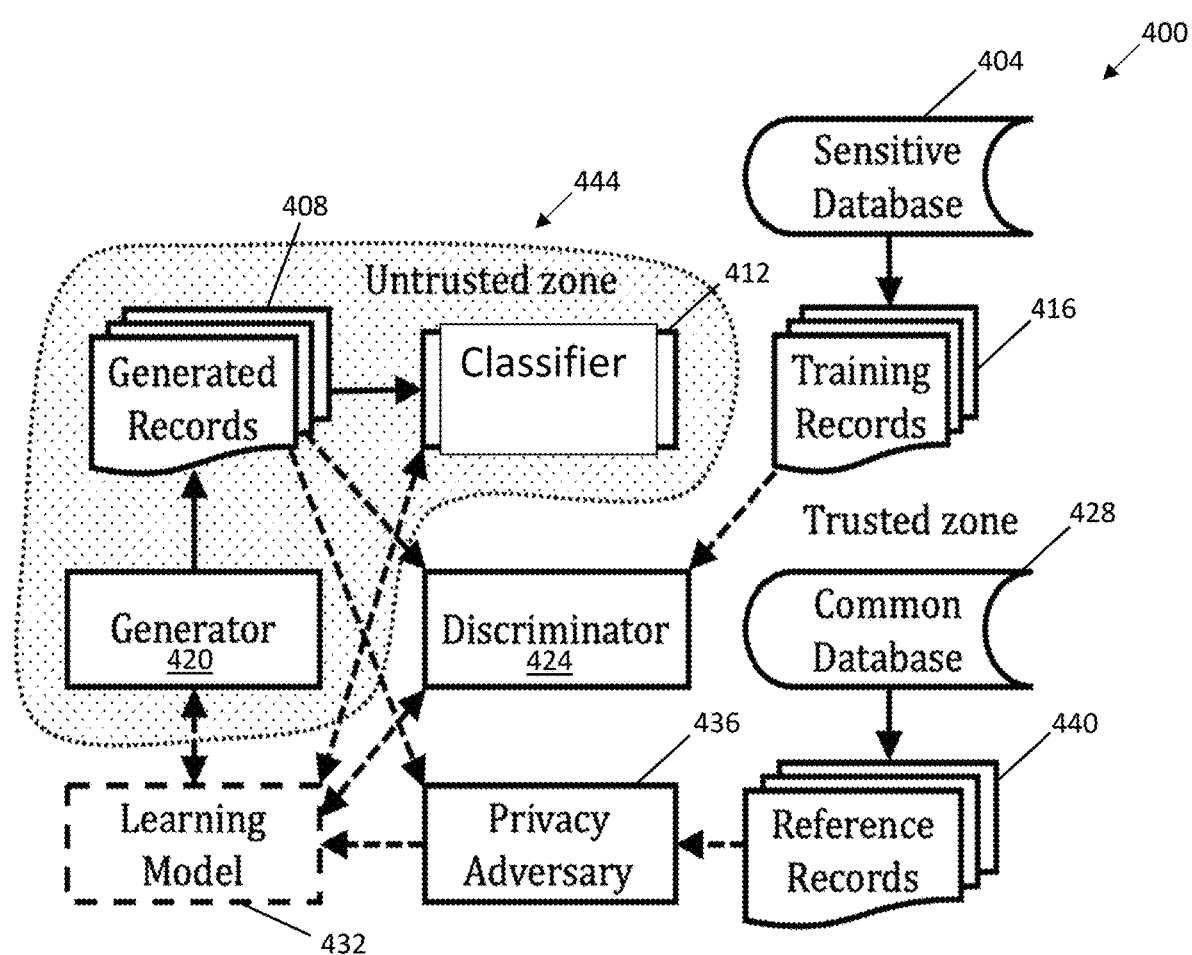
FIG. 4 is a block diagram of an example data generating system for generating representative data while preserving data privacy, in accordance with an example embodiment.

FIG. 4 is a block diagram of an example data generating system 400 for generating representative data while preserving data privacy, in accordance with an example embodiment. With reference to FIG. 4, the generator 420, the discriminator 424, a classifier 412, and the privacy adversary 436 are machine learning components. In one example embodiment, the generator 420, the discriminator 424, the classifier 412, and the privacy adversary 436 are in data communication with each other (for example, via a shared data structure) so as to gain access to the generated records 420, the training records 416, and other data. The discriminator 424 and the privacy adversary 436 are reductionist from feature vector to binary decision. The generator 420 generates a full feature vector from a noise vector and a desired class label (Y_G). In one example embodiment, a learning model 432 is used by the generator 420 (in an untrusted zone 444) to create generated records 408 based on training records 416 obtained from a database of sensitive data (sensitive database 404). As described above, the discriminator 424 is trained to identify the generated samples as being fake (that is, identify the generated records 420 as being generated) and to identify a training sample as being real (that is, as originating from the training records 416). In essence, the discriminator 424 is awarded for successfully identifying a generated sample as being fake and the generator 420 is awarded for fooling the discriminator 424 into identifying a generated sample as being real. The learning model 432 is then revised based on the results and corresponding awards attained by the discriminator 424. Meanwhile, the privacy adversary 436 is trained to distinguish between the training records 416 and the reference records 440, and to identify a training sample as being more similar to the distribution of the generated records 408 than the distribution of the reference records 440. In one example embodiment, the privacy adversary 436 is a multi-layer neural network that produces a binary value indicating whether the input sample (a training sample from the training records 416) "originates from" the generated records 408 or the reference records 440. The privacy adversary 436 is awarded for successfully identifying a training sample as originating from the generated records 408 and the generator 420 is awarded for fooling the privacy adversary 436 into identifying the training sample as not originating from the generated records 408.

In general, the generated samples (generated records 408) should appear realistic and similar to the provided training set (training records 416) in order to fool the discriminator 424. In other words, the distribution of the generated samples should look like the distribution of the training samples. The classifier 412 should indicate that the generated sample is plausible, based on the conditioning, which could be a class label provided as input to the generator 420. The privacy adversary 436 should be fooled to indicate that the target sample is not an element of the generated records

408. That is, the generated sample should not be too similar to the training records 416 lest the privacy adversary 436 determines that the training sample is closer (more similar) to the generated distribution of the generated records 408 than to the reference distribution of the reference records 440. So, the generator 420 will produce a distorted version of the training distribution to evade (fool) the privacy adversary 436 (and therefore a real adversary), but not so distorted that it is overly penalized by the discriminator 424 or the classifier 412.

Training the various models requires different weight updates for each of the modules during back propagation. In one example embodiment, as described more fully below in conjunction with FIG. 6, the generator 420, the discriminator 424, the classifier 412, and the privacy adversary 436 are sequentially trained. In one example embodiment, the training sequence is repeated to further improve the operation of the system 400. Following training, the generated records 408 produced by the generator 420 are provided to an application programming interface (API) endpoint in a cloud environment.

System Relationships $$n, Y_G \rightarrow g(n,c) \rightarrow X_G \rightarrow d(X_G) \rightarrow N_c+1 \quad \text{Generator accuracy:}$$

The generator is conditioned with a noise vector and the desired class label, produces a generated sample that can be identified as a generated sample by the discriminator.

$$P_T \rightarrow X_T \rightarrow d(X_T) \rightarrow Y_T \quad \text{Train discriminator:}$$

Sampling from the training distribution, the discriminator identifies the sample as a real sample with the correct class label.

$$g(n,c) \rightarrow X_G \rightarrow f(X_G) \rightarrow Y_G \quad \text{Class accuracy:}$$

A generated sample can be correctly labeled by the classifier/utility function according to its conditioning label.

$$f(X_G) \rightarrow Y_G' \rightarrow h(X_G, Y_G, Y_G') \rightarrow Z_G \quad \text{Attack accuracy:}$$

The classifier produces a label estimate for a generated sample, where this label is used by the privacy adversary 436 to identify the sample as being a part of the generated records 408.

$$f(X_R) \rightarrow Y_R' \rightarrow h(X_R, Y_R, Y_R') \rightarrow Z_R \quad \text{Test attack:}$$

The classifier produces a label estimate for a reference sample, where this label is used by the privacy adversary 436 to identify the sample as being a part of the reference records 440.

Figure 5:
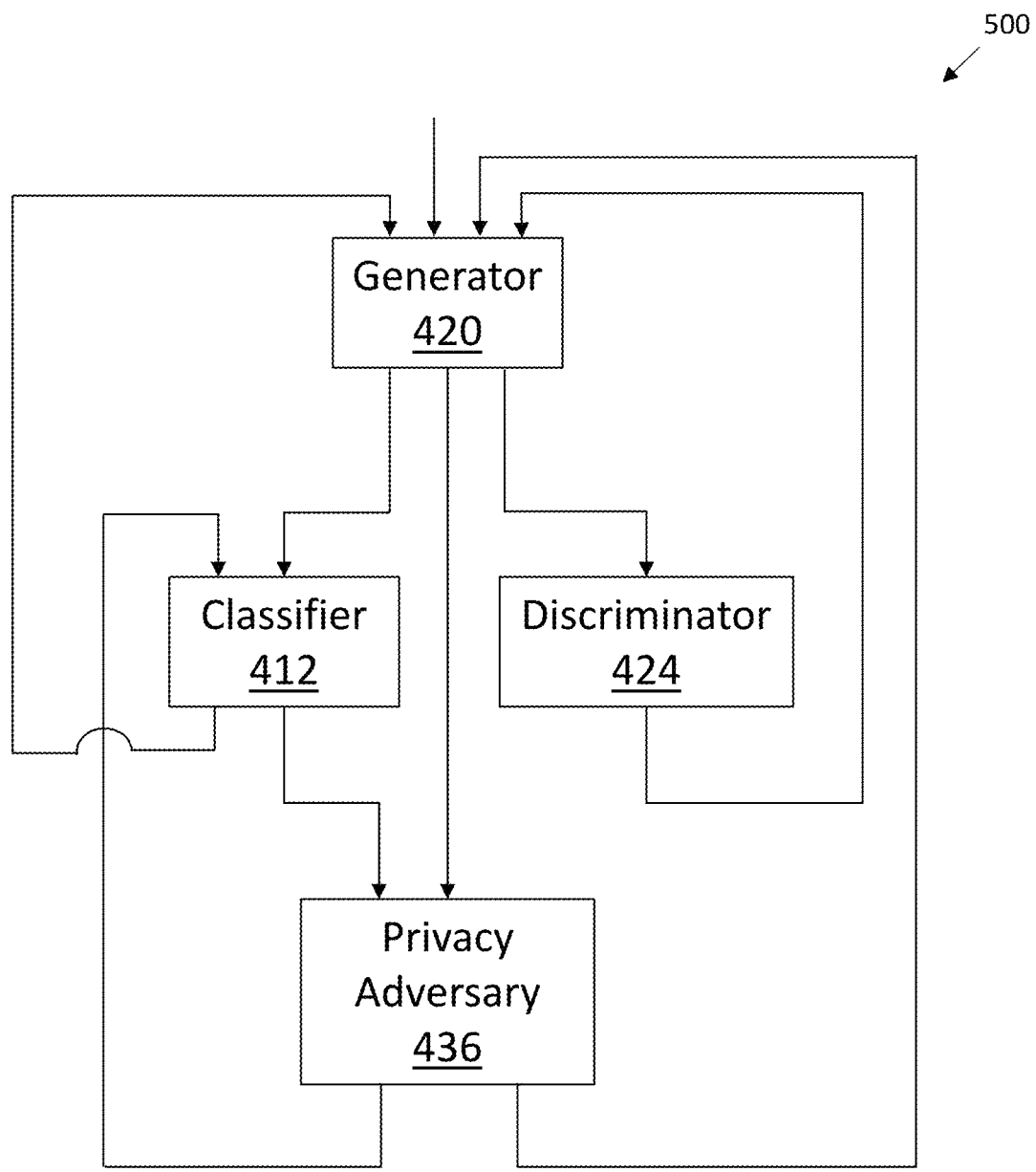
FIG. 5 illustrates the logical connectivity between machine learning components during training of the data generating system of FIG. 4, in accordance with an example embodiment.

FIG. 5 illustrates the logical connectivity 500 between machine learning components during training of the data generating system 400, in accordance with an example embodiment. In one example embodiment, the generator 420, the discriminator 424, the classifier 412, and the privacy adversary 436 are implemented on the same computing system, such as the same server system. Other implementations could use a different architecture.

Generator Update:

In one example embodiment, the generator 420 is trained based on:

1) the discriminator 424 configured with the generator output as input (an output of one indicating a "real" classification):

$$\log(d(g(n,Y\_G)))$$

2) the classifier 412 configured with the generator output as input (conditioned on class–correct classification):

$$\log(p(f(g(n,Y\_G))|Y\_G))$$

3) the privacy adversary 436 configured with a set of generator outputs and accompanying conditioning class and utility inferred class, a set of reference samples, and a training sample (an output of one indicating reference-like):

$$\log(h(g(n,Y\_G),\{X\_R\},X\_T,\{Y\_G\},\{Y\_R\},Y\_T,\{f(X\_G)\},\{f(X\_R)\},f(X\_T)))$$

Based on the above, the generator 420 is trained using the following formula:

$$\max_g (\log(d(g(n,Y\_G))) + \log(p(f(g(n,Y\_G))|Y\_G)) + \log(h(g(n,Y\_G),\{X\_R\}, X\_T, \{Y\_G\}, \{Y\_R\}, Y\_T, \{f(X\_G)\}, \{f(X\_R)\}, f(X\_T))))$$

Discriminator Update:

The discriminator 424 should be trained to detect that a given generated sample is fake (that is, detect that the sample is generated) and that a given training sample is real (that is, detect that the sample originates from the training records 416). The discriminator 424 is a classifier and a conditional generator, and reflects the utility that is desired of the generated samples. It gives a label Y as close as possible to what the ground truth was (that is, the ground truth given to the generator 420). In general, the discriminator 424 outputs a logic zero if it assesses that a generated sample is fake and outputs a logic one if it assesses that a training sample is real (correct class label).

In one example embodiment, the discriminator 424 is trained based on:

1) the discriminator 424 configured with the generator output as input (an output of zero indicating "fake"):

$$\log(1-d(g(n,Y\_G)))$$

2) the discriminator 424 configured with the training sample as input (an output of one indicating "real"):

$$\log(d(X\_T))$$

Based on the above, the discriminator 424 is trained using the following formula:

$$\max\_d(\log(1-d(g(n,Y\_G)))+\log(d(X\_T))-|\nabla d(X_T)|_2), X_T \in \{X_T\}, n \in [0,1]^d, Y_G \in [0,C]$$

The gradient or training instability of the discriminator 424 should be penalized, as in the third term, in order to stabilize the gradients that the other updates use. This is so, given that the reductionist operation of the discriminator 424 has many satisfying instantiations and will tend to change.

Classifier Update:

The classifier 412 is similar to the discriminator 424 and is also given generated samples and training samples as input. It should, however, measure the distortion of the generated samples, given a required conditioning during generation, which could be to generate samples from a particular data class or with a set of desired properties. This distortion measure function can be learnt. At the same time, the activations and output of the classifier 412 should not inadvertently alert the privacy adversary 436 that a generated sample originates from the training records 416.

In one example embodiment, the classifier 412 is trained based on:

1) the classifier 412 configured with the generator output as input (conditioned on class–correct classification):

$$p(f(g(n,Y\_G))|Y\_G)$$

2) the classifier 412 configured with the training sample as input (conditioned on class–correct classification):

$$p(f(X\_T)|Y\_T)$$

3) the privacy adversary 436 configured with a set of generator outputs and accompanying conditioning class and utility inferred class, a set of reference samples (with class labels), and a training sample (with class label, classifier-provided label; an output of one indicating reference-like):

$$\log(h(g(n,Y\_G),\{X\_R\},X\_T,\{Y\_G\},\{Y\_R\},Y\_T,\{f(X\_G)\},\{f(X\_R)\},f(X\_T)))$$

Based on the above, the classifier 412 is trained using the following formula:

$$\max\_f(\log(p(f(g(n,Y\_G))|Y\_G))+\log(p(f(X\_T)|Y\_T))++\log(h(g(n,Y\_G),\{X\_R\},X\_T,\{Y\_G\},\{Y\_R\},Y\_T,\{f(X\_G)\},\{f(X\_R)\},f(X\_T))))$$

Privacy Adversary Update:

The privacy adversary model (also known as the attack model herein) looks at two datasets: one representative of the training data (training records 416) and one representative of the larger original dataset (common database 428) from which both the training samples and the reference samples (reference records 440) are derived. The generated records 408 are representative of the training records 416, and the adversary aims to identify the generated records 408 as originating from the training records 416. The reference records 440 are a held-out sample; in other words, the training records 416 and the reference records 440 originate from the same larger common database 428, but the reference records 440 include data excluded from the training records 416. The privacy adversary 436 makes a distinction by accurately indicating that the reference records 440 are not members of the training records 416 and/or indicating that the training records 416 are not members of reference records 440. During production, if samples, such as samples from the training records 416, happen to be classified as members of the generated records 408, then it means that the generator 420 did not sufficiently "fool" the privacy adversary 436 regarding classification of the generated samples.

In one example embodiment, the privacy adversary model considers a set of generator samples from the generated records 408 and accompanying conditioning class (input at generator at generation time) and utility inferred class (classifier label estimate for generated sample), a set of reference samples from the reference records 440, and a training sample from the training records 416. The privacy adversary model is trained to output a logic zero if the training sample is assessed to be more similar to the generated record distribution than to the reference record distribution, meaning the privacy adversary 436 was able to correlate the generated data with the training records 416 instead of correlating the training sample with the reference records 440. The privacy adversary model is trained to output a logic one if a previously-excluded reference sample is assessed to be more similar to the reference distribution than to the generated distribution. It is noted that the generator 420 could directly learn the reference distribution via the privacy adversary 436. The privacy adversary 436 aims to identify training samples as closer to the generated records 408 than the reference records 440, so the more distorted and different the generated records 408 are from both the training records 416 and the reference records 440, the easier it is to fool the privacy adversary 436. The closer the generated records 408 are to the reference records 440, the more often the privacy adversary 436 could be successful since the training records 416 could be equally close to the generated records 408 as the reference records 440. If the generator learns the reference distribution, then because it is already public, there is no apparent privacy leak. If the privacy adversary 436 outputs a logic one, it indicates that a potential real adversary would be "fooled" by the generated samples and be unable to make a valid membership decision.

In one example embodiment, the privacy adversary 436 is trained based on:

1) the privacy adversary 436 configured with a set of generator outputs and accompanying conditioning class and utility inferred class, a set of reference samples (with class labels), and a training sample (with class label; an output of zero indicating generator-like):

$$1-h(g(n,Y\_G),\{X\_R\},X\_T,\{Y\_G\},\{Y\_R\},Y\_T,\{f(X\_G)\},\{f(X\_R)\},f(X\_T))$$

2) the privacy adversary 436 configured with a set of generator outputs and accompanying conditioning class and utility inferred class, a set of reference samples (with class labels), and a previously-excluded reference sample (with class label; an output of one indicating reference-like):

$$h(g(n,Y\_G),\{X\_R\},X\_R',\{Y\_G\},\{Y\_R\},Y\_R',\{f(X\_G)\},\{f(X\_R')\},f(X\_T))$$

Based on the above, the privacy adversary 436 is trained using the following formula:

$$\max\_h(\log(1-h(g(n,Y\_G),\{X\_R\},X\_T,\{Y\_G\},\{Y\_R\},Y\_T,\{f(X\_G)\},\{f(X\_R)\},f(X\_T))+\log(h(g(n,Y\_G),\{X\_R\},X\_R',\{Y\_G\},\{Y\_R\},Y\_R',\{f(X\_G)\},\{f(X\_R')\},f(X\_T))))$$

Figure 6:
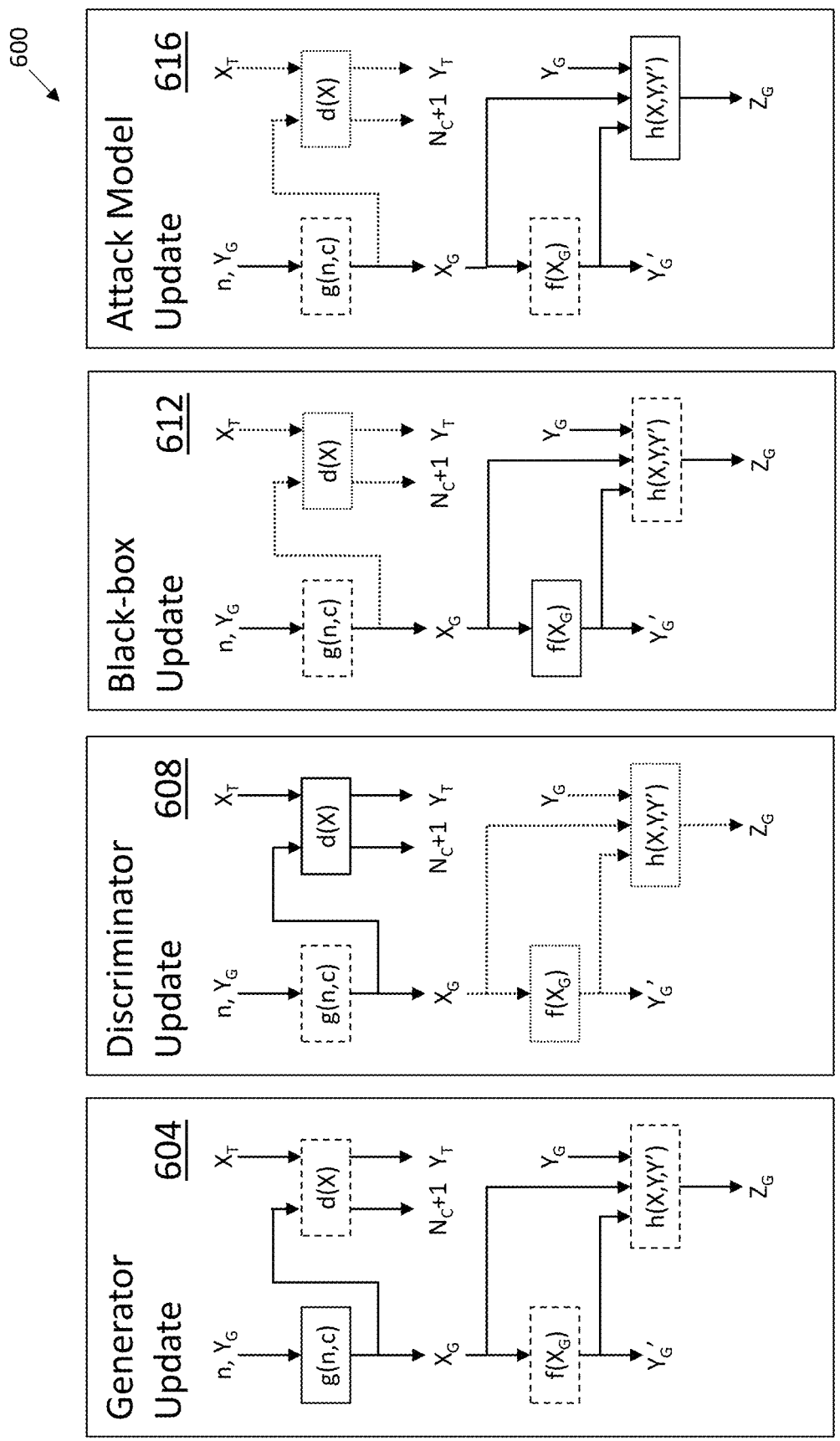
FIG. 6 illustrates an example training sequence for the machine learning components of the data generating system of FIG. 4, in accordance with an example embodiment.

FIG. 6 illustrates an example training sequence 600 for the machine learning components of the data generating system 400, in accordance with an example embodiment. As illustrated in FIG. 6, the generator 420 is trained during a generator update phase 604 based on the discriminator 424, the classifier 412, and the privacy adversary 436. The discriminator 424 is trained during a discriminator update phase 608 based on the generator 420. The classifier 412 is trained during a classifier update phase 612 based on the generator 420 and the privacy adversary 436. The privacy adversary 436 is trained during an attack model update phase 616 based on the generator 420 and the classifier 412. The training sequence may continuously repeat to continuously improve the performance of the data generating system 400.

Figure 7:
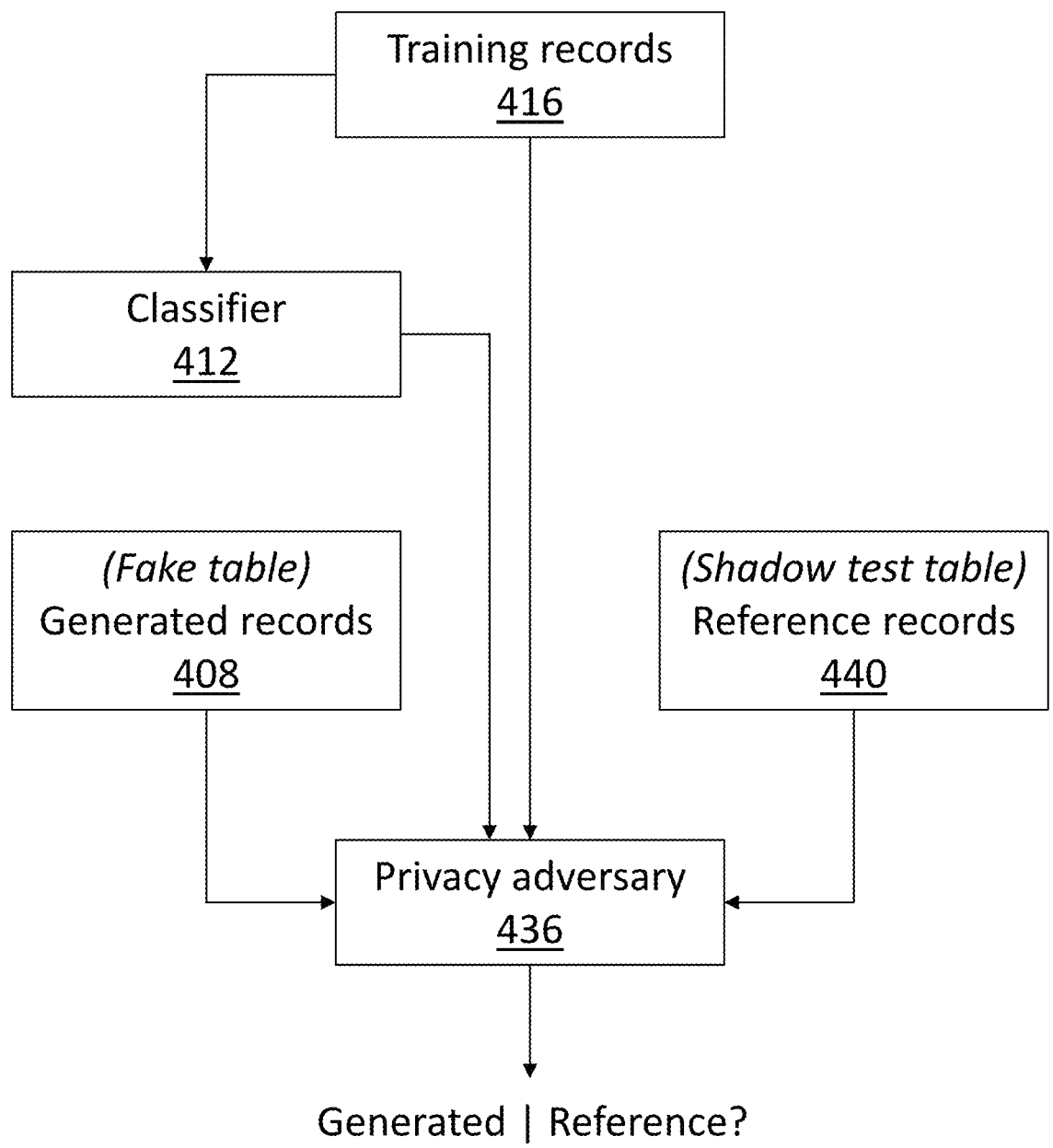
FIG. 7 illustrates an example membership inference attack process, against which one or more example embodiments can defend.

FIG. 7 illustrates an example membership inference attack process, against which one or more example embodiments can defend. The membership inference attack process is executed, for example, by an adversary 436 attempting to infer a membership of a particular sample in the training records 416. D is a discriminator 424 seen in FIG. 5 (that is essentially a classifier) that produces a binary decision to determine if a given sample is a member of the training records 416. The fake table corresponds to the generated records 408 and the shadow test table corresponds to the reference records 440. The shadow test table is similar to the reference records 440. The fake table is similar to the generated records 408. Exposing the generated records 408 to a cloud environment via an API can be contrasted against only exposing a trained classifier. If the generated records 408 have some measure of privacy that has been optimized for (in accordance with aspects of the invention), then this data can be exposed and its users have the ability to train a variety of classifiers, instead of potentially being limited to only one privacy-hardened classifier, thus improving the technological process of training a classifier while maintaining privacy and security).

Given the discussion thus far, it will be appreciated that, in general terms, an exemplary system, according to an aspect of the invention, includes a generator 420 configured to create, using a learning model 432, one or more generated records 408 based on a plurality of training records 416 obtained from a sensitive database 404; a discriminator 424 trained to identify the generated records 408 as being generated based on the training records 416; and a privacy adversary 436 trained to identify a training sample as being more similar to a distribution of the generated records 408 than a distribution of reference records 440, the generator 420, the discriminator 424, and the privacy adversary 436 being in data communication.

In one aspect, a method for generating representative data comprises creating, by a generator 420 using a learning model 432, one or more generated records 408 based on a plurality of training records 416 obtained from a sensitive database 404; identifying, by a discriminator 424, the generated records 408 as being generated based on the training records 416; and identifying, by a privacy adversary 436, a training sample as being more similar to a distribution of the generated records 408 than a distribution of reference records 440.

In one aspect, a non-transitory computer readable medium comprises computer executable instructions which when executed by a computer cause the computer to perform the method of implementing a generator, a discriminator, and a privacy adversary; creating, by the generator 420 using a learning model 432, one or more generated records 408 based on a plurality of training records 416 obtained from a sensitive database 404; identifying, by the discriminator 424, the generated records 408 as being generated based on the training records 416; and identifying, by the privacy adversary 436, a training sample as being more similar to a distribution of the generated records 408 than a distribution of reference records 440.

In one example embodiment, the learning model 432 is revised based on results attained by the discriminator 424. In one example embodiment, the privacy adversary 436 comprises a multi-layer neural network that produces a binary value indicating whether an input sample originates from the generated records 408 or the reference records 440. In one example embodiment, the generator 420 is configured to be awarded for fooling the privacy adversary 436 into identifying a given one of the training samples as being unrelated to the generated records 408. In one example embodiment, the generator 420 is configured to be: trained to generate a distribution of the generated records 408 similar to a distribution of the training records 416 in order to reduce a performance of the discriminator 424 and distorted from the distribution of the training records 416 in order to reduce a performance of the privacy adversary 436.

In one example embodiment, the system further comprises a classifier 412, the generator, the discriminator, the privacy adversary, and the classifier is in data communication, wherein the generator 420 is configured to be trained based on the discriminator 424 being configured with output of the generator 420 as input, wherein an output of one indicates a real classification, the classifier 412 being configured with the generator output as input, conditioned on class, and the privacy adversary 436 being configured with a set of generator outputs and accompanying conditioning class and utility inferred class, a set of reference samples, and a given training sample, wherein an output of one from the privacy adversary 436 indicates a reference-like classification. In one example embodiment, the generator 420 is configured to be trained based on a formula of:

$$\max_g(\log(d(g(n, Y\_G))) + \log(p(f(g(n, Y\_G))|Y\_G)) + \log(h(g(n, Y\_G),$$
$$\{X\_R\}, X\_T, \{Y\_G\}, \{Y\_R\}, Y\_T, \{f(X\_G)\}, \{f(X\_R)\}, f(X\_T))))$$

wherein:
 n is a random noise vector of d dimensions;
 Y_G is an output features/class label;
 X_G is a given generated record;
 X_T is a given training sample;
 Y_T is a predicted training feature/output label;
 X_R is a reference sample;
 Y_R is a predicted reference feature/output label;
 g(n, Y) is a generator (noise vector, true label);
 d is a discriminator module;
 d(X) is a discriminator (sample);
 f is a classifier model;
 f(X) is a utility (sample)–classifier output [p(f(X)]; and
 h is a membership privacy adversary.

In one example embodiment, the system further comprises a classifier 412, the generator, the discriminator, the privacy adversary, and the classifier being in data communication, wherein the classifier 412 is configured to be trained to indicate that the generated records 408 are plausible, based on conditioning, and to generate a class label as input to the generator 420. In one example embodiment, the system further comprises a classifier 412, the generator, the discriminator, the privacy adversary, and the classifier being in data communication, wherein the system is configured to sequentially train the generator 420, the discriminator 424, the classifier 412, and the privacy adversary 436. In one example embodiment, the discriminator 424 is configured to be trained to detect that a given generated record 408 is distinguished from the training records 416 and that a given training sample originates from the training records 416. In one example embodiment, the discriminator 424 is configured to be trained based on the discriminator 424 configured with output of the generator as input, and the discriminator 424 configured with a given training sample as input.

In one example embodiment, the discriminator 424 is configured to be trained based on a formula of:

$$\max\_d(\log(1-d(g(n,Y\_G))) + \log(d(X\_T))),$$
$$X\_T \in \{X_T\}, n \in [0,1]^d, Y\_G \in [0,C]$$

wherein:
 C is a count of classes in a dataset;
 n is a random noise vector of d dimensions;
 Y_G is an output features/class label;
 X_T is a given training sample;
 g(n, Y) is a generator (noise vector, true label);
 d is a discriminator module.

In one example embodiment, the system further comprises a classifier 412, the generator, the discriminator, the privacy adversary, and the classifier is in data communication, wherein the classifier 412 is configured to measure a distortion of a given generated sample, given a conditioning during generation, the conditioning being to generate samples from a particular data class or with a set of desired properties.

In one example embodiment, the system further comprises a classifier 412 the generator, the discriminator, the privacy adversary, and the classifier being in data communication, wherein the classifier 412 is configured to be trained based on the classifier 412 being configured with output of the generator 420 as input, conditioned on class, correct classification; the classifier 412 being configured with a given training sample as input, conditioned on class, correct classification; and the privacy adversary 436 being configured with a set of generator outputs and accompanying conditioning class and utility inferred class, a set of reference samples with class labels, and a given training sample with class label, classifier-provided label, wherein an output of one from the privacy adversary 436 indicates a reference-like classification.

In one example embodiment, the system further comprises a classifier 412, and the generator, the discriminator, the privacy adversary, and the classifier are in data communication. The classifier 412 is configured to be trained based on a formula of:

$$\max\_f(\log(p(f(g(n,Y\_G))|Y\_G)) + \log(p(f(X\_T)|Y\_T)) + + \log(h(g(n,Y\_G), \{X\_R\}, X\_T, \{Y\_G\}, \{Y\_R\}, Y\_T, \{f(X\_G)\}, \{f(X\_R)\}, f(X\_T))))$$

wherein:
- n is a random noise vector of d dimensions;
- Y_G is an output features/class label;
- X_G is a given generated record;
- X_T is a given training sample;
- Y_T is a predicted training feature/output label;
- X_R is a given reference sample;
- Y_R is a predicted reference feature/output label;
- g(n, Y) is a generator (noise vector, true label);
- f is a classifier model;
- f(X) is a utility (sample)–classifier output [p(f(X)]; and
- h is a membership privacy adversary.

In one example embodiment, the privacy adversary 436 is configured to be trained based on the privacy adversary 436 being configured with a set of generator outputs and accompanying conditioning class and utility inferred class, a set of reference samples with class labels, and a given training sample with class label; an output of zero indicates a generator-like classification; and the privacy adversary 436 is configured with a set of generator outputs and accompanying conditioning class and utility inferred class, a set of reference samples with class labels, and a previously-excluded reference sample with class label, wherein an output of one indicates a reference-like classification.

In one example embodiment, the privacy adversary 436 is configured to be trained using a formula of:

$$\max\_h(\log(1-h(g(n,Y\_G), \{X\_R\}, X\_T, \{Y\_G\}, \{Y\_R\}, Y\_T, \{f(X\_G)\}, \{f(X\_R)\}, f(X\_T))) + \log(h(g(n,Y\_G), \{X\_R\}, X\_R', \{Y\_G\}, \{Y\_R\}, Y\_R', \{f(X\_G)\}, \{f(X\_R')\}, f(X\_T))))$$

wherein:
- Y_R' is a predicted reference feature/output label;
- X_R' is a reference test sample held-out from reference records;
- n is a random noise vector of d dimensions;
- Y_G is an output features/class label;
- X_G is a given generated record;
- X_T is a given training sample;
- Y_T is a predicted training feature/output label;
- X_R is a given reference sample;
- Y_R is a predicted reference feature/output label;
- g(n, Y) is a generator (noise vector, true label);
- f is a classifier model;
- f(X) is a utility (sample)–classifier output [p(f(X)]; and
- h is a membership privacy adversary.

In one example embodiment, the training records 416 and the reference records 440 originate from a same larger common database 428 and the reference records 440 are composed of data excluded from the training records 416. In one example embodiment, the system further comprises a classifier 412, and the generator, the discriminator, the privacy adversary, and the classifier are in data communication. The generator 420 is configured to be trained during a generator update phase 604 based on the discriminator 424, the classifier 412, and the privacy adversary 436. The discriminator 424 is configured to be trained during a discriminator update phase 608 based on the generator 420. The classifier 412 is configured to be trained during a classifier update phase 612 based on the generator 420 and the privacy adversary 436. The privacy adversary 436 is configured to be trained during an attack model update phase 616 based on the generator 420 and the classifier 412.

In one example embodiment, the generator 420 is further configured to provide the generated records 408 to an application programming interface (API) endpoint in a cloud environment.

Figure 8:
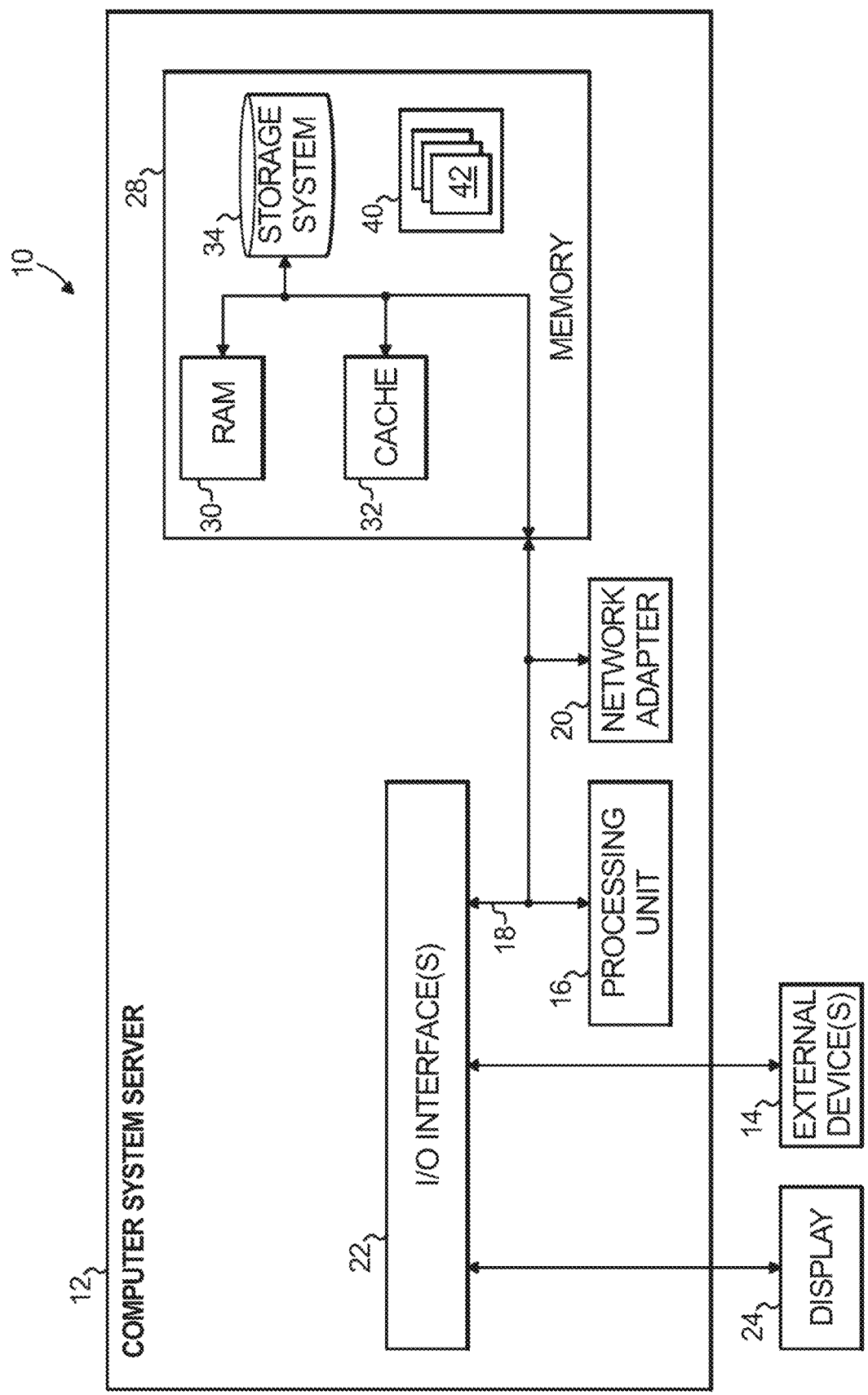
FIG. 8 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 8 depicts a computer system that may be useful in implementing one or more aspects and/or elements of the invention, also representative of a cloud computing node according to an embodiment of the present invention. Referring now to FIG. 8, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, implemented using at least one hardware device, for generating representative data, the system comprising:
    a generator configured to create, using a learning model, one or more generated records based on a plurality of training records obtained from a sensitive database;
    a discriminator trained to identify the generated records as being generated based on the training records;
    a classifier configured to be trained based on output of the generator being used as input for training and to produce a label estimate for each of one or more of the generated records; and
    a privacy adversary trained to identify a training sample as being more similar to a distribution of the generated records than a distribution of reference records based on the one or more label estimates, the generator, the discriminator, and the privacy adversary being in data communication;
    wherein the generator is configured to be trained based on a formula of:

$$\max_g(\log(d(g(n, Y\_G))) + \log(p(f(g(n, Y\_G))|Y\_G)) + \log(h(g(n, Y\_G),$$
$$\{X\_R\}, X\_T, \{Y\_G\}, \{Y\_R\}, Y\_T, \{f(X\_G)\}, \{f(X\_R)\}, f(X\_T))))$$

wherein:
n is a random noise vector of d dimensions;
Y_G is an output features/class label;
X_G is a given generated record;
X_T is a given training sample;
Y_T is a predicted training feature/output label;
X_R is a reference sample;
Y_R is a predicted reference feature/output label;
g(n, Y) is a generator (noise vector, true label);
d is a discriminator module;
d(X) is a discriminator (sample);
f is a classifier model;
f(X) is a utility (sample)–classifier output [p(f(X)]; and
h is a membership privacy adversary.

2. A system, implemented using at least one hardware device, for generating representative data, the system comprising:
    a generator configured to create, using a learning model, one or more generated records based on a plurality of training records obtained from a sensitive database;
    a discriminator trained to identify the generated records as being generated based on the training records;
    a classifier configured to be trained based on output of the generator being used as input for training and to produce a label estimate for each of one or more of the generated records; and
    a privacy adversary trained to identify a training sample as being more similar to a distribution of the generated records than a distribution of reference records based on the one or more label estimates, the generator, the discriminator, and the privacy adversary being in data communication;
    wherein the discriminator is configured to be trained based on a formula of:

$$\max\_d(\log(1-d(g(n, Y\_G))) + \log(d(X\_T))),$$
$$X\_T \in \{X_T\}, n \in [0,1]^d, Y\_G \in [0,C]$$

wherein:
C is a count of classes in a dataset;
n is a random noise vector of d dimensions;
Y_G is an output features/class label;
X_T is a given training sample;
g(n, Y) is a generator (noise vector, true label);
d is a discriminator module.

3. A system, implemented using at least one hardware device, for generating representative data, the system comprising:
    a generator configured to create, using a learning model, one or more generated records based on a plurality of training records obtained from a sensitive database;
    a discriminator trained to identify the generated records as being generated based on the training records;
    a classifier configured to be trained based on output of the generator being used as input for training and to produce a label estimate for each of one or more of the generated records; and
    a privacy adversary trained to identify a training sample as being more similar to a distribution of the generated records than a distribution of reference records based on the one or more label estimates, the generator, the discriminator, and the privacy adversary being in data communication;
    the generator, the discriminator, the privacy adversary, and the classifier being in data communication, wherein:
    the classifier is configured to be trained based on the classifier being configured with the output of the generator as the input, conditioned on class, correct classification;
    the classifier being configured with a given training sample as the input, conditioned on class, correct classification; and
    the privacy adversary being configured with a set of generator outputs and accompanying conditioning class and utility inferred class, a set of reference samples with class labels, and a given training sample with class label, classifier-provided label, wherein an output of one from the privacy adversary indicates a reference-like classification.

4. A system, implemented using at least one hardware device, for generating representative data, the system comprising:
   a generator configured to create, using a learning model, one or more generated records based on a plurality of training records obtained from a sensitive database;
a discriminator trained to identify the generated records as being generated based on the training records;
   a classifier configured to be trained based on output of the generator being used as input for training and to produce a label estimate for each of one or more of the generated records; and
   a privacy adversary trained to identify a training sample as being more similar to a distribution of the generated records than a distribution of reference records based on the one or more label estimates, the generator, the discriminator, and the privacy adversary being in data communication;
   the generator, the discriminator, the privacy adversary, and the classifier being in data communication, wherein the classifier is configured to be trained based on a formula of:

$$\max\_f(\log(p(f(g(n,Y\_G))|Y\_G)) + \log(p(f(X\_T)|Y\_T)) + + \log(h(g(n,Y\_G),\{X\_R\},X\_T,\{Y\_G\},\{Y\_R\},Y\_T,\{f(X\_G)\},\{f(X\_R)\},f(X\_T))))$$

wherein:
n is a random noise vector of d dimensions;
Y_G is an output features/class label;
X_G is a given generated record;
X_T is a given training sample;
Y_T is a predicted training feature/output label;
X_R is a given reference sample;
Y_R is a predicted reference feature/output label;
g(n, Y) is a generator (noise vector, true label);
f is a classifier model;
f(X) is a utility (sample)–classifier output [p(f(X)]; and
h is a membership privacy adversary.

5. A system, implemented using at least one hardware device, for generating representative data, the system comprising:
   a generator configured to create, using a learning model, one or more generated records based on a plurality of training records obtained from a sensitive database;
a discriminator trained to identify the generated records as being generated based on the training records;
   a classifier configured to be trained based on output of the generator being used as input for training and to produce a label estimate for each of one or more of the generated records; and
   a privacy adversary trained to identify a training sample as being more similar to a distribution of the generated records than a distribution of reference records based on the one or more label estimates, the generator, the discriminator, and the privacy adversary being in data communication;
   wherein:
   the privacy adversary is configured to be trained based on the privacy adversary being configured with a set of generator outputs and accompanying conditioning class and utility inferred class, a set of reference samples with class labels, and a given training sample with class label;
   an output of zero indicates a generator-like classification; and
   the privacy adversary being configured with a set of generator outputs and accompanying conditioning class and utility inferred class, a set of reference samples with class labels, and a previously-excluded reference sample with class label, wherein an output of one indicates a reference-like classification.

6. A system, implemented using at least one hardware device, for generating representative data, the system comprising:
   a generator configured to create, using a learning model, one or more generated records based on a plurality of training records obtained from a sensitive database;
a discriminator trained to identify the generated records as being generated based on the training records;
   a classifier configured to be trained based on output of the generator being used as input for training and to produce a label estimate for each of one or more of the generated records; and
   a privacy adversary trained to identify a training sample as being more similar to a distribution of the generated records than a distribution of reference records based on the one or more label estimates, the generator, the discriminator, and the privacy adversary being in data communication;
   wherein the privacy adversary is configured to be trained using a formula of:

$$\max\_h(\log(1-h(g(n,Y\_G),\{X\_R\},X\_T,\{Y\_G\},\{Y\_R\},Y\_T,\{f(X\_G)\},\{f(X\_R)\},f(X\_T))) + \log(h(g(n,Y\_G),\{X\_R\},X\_R',\{Y\_G\},\{Y\_R\},Y\_R',\{f(X\_G)\},\{f(X\_R')\},f(X\_T))))$$

wherein:
Y_R' is a predicted reference feature/output label;
X_R' is a reference test sample held-out from reference records;
n is a random noise vector of d dimensions;
Y_G is an output features/class label;
X_G is a given generated record;
X_T is a given training sample;
Y_T is a predicted training feature/output label;
X_R is a given reference sample;
Y_R is a predicted reference feature/output label;
g(n, Y) is a generator (noise vector, true label);
f is a classifier model;
f(X) is a utility (sample)–classifier output [p(f(X)]; and
h is a membership privacy adversary.

7. A system, implemented using at least one hardware device, for generating representative data, the system comprising:
   a generator configured to create, using a learning model, one or more generated records based on a plurality of training records obtained from a sensitive database;
a discriminator trained to identify the generated records as being generated based on the training records;
   a classifier configured to be trained based on output of the generator being used as input for training and to produce a label estimate for each of one or more of the generated records; and
   a privacy adversary trained to identify a training sample as being more similar to a distribution of the generated records than a distribution of reference records based on the one or more label estimates, the generator, the discriminator, and the privacy adversary being in data communication;
   the generator, the discriminator, the privacy adversary, and the classifier being in data communication, wherein:
   the generator is configured to be trained during a generator update phase based on the discriminator, the classifier, and the privacy adversary;

the discriminator is configured to be trained during a discriminator update phase based on the generator;

the classifier is configured to be trained during a classifier update phase based on the generator and the privacy adversary; and the privacy adversary is configured to be trained during an attack model update phase based on the generator and the classifier.

* * * * *